US008453537B2

(12) United States Patent
Wilson

(10) Patent No.: US 8,453,537 B2
(45) Date of Patent: *Jun. 4, 2013

(54) FATIGUE RELIEVING SUPPORT FOR STEERING WHEELS AND THE LIKE

(76) Inventor: Douglas B. Wilson, La Canada Flintridge, CA (US)

( * ) Notice: Subject to any disclaimer, the term of this patent is extended or adjusted under 35 U.S.C. 154(b) by 1683 days.

This patent is subject to a terminal disclaimer.

(21) Appl. No.: 10/727,306

(22) Filed: Dec. 3, 2003

(65) Prior Publication Data

US 2004/0255713 A1    Dec. 23, 2004

Related U.S. Application Data

(63) Continuation-in-part of application No. 10/720,821, filed on Nov. 24, 2003.

(60) Provisional application No. 60/429,130, filed on Nov. 26, 2002.

(51) Int. Cl.
*B62D 1/04* (2006.01)
*B62D 1/06* (2006.01)

(52) U.S. Cl.
USPC ................................ 74/558; 74/552; 74/558.5

(58) Field of Classification Search
USPC .... 74/558, 558.5, 552; 280/750, 731; 441/67; 5/636
See application file for complete search history.

(56) References Cited

U.S. PATENT DOCUMENTS

| 1,575,848 | A |   | 3/1926  | Laubach |
| 1,834,537 | A |   | 12/1931 | Shipley |
| 2,118,540 | A |   | 5/1938  | Arsdel |
| 2,134,020 | A |   | 10/1938 | Anson |
| 2,335,256 | A |   | 11/1943 | Berzer |
| 3,884,092 | A | * | 5/1975  | Raudebaugh .................... 74/558 |
| 3,937,629 | A |   | 2/1976  | Hamasaka .................... 74/551.8 |
| 4,287,621 | A | * | 9/1981  | Kertz ................................. 5/636 |
| 4,708,676 | A | * | 11/1987 | Lin ................................. 441/67 |
| 4,875,386 | A |   | 10/1989 | Dickerson .................... 74/551.9 |
| 4,894,033 | A | * | 1/1990  | Chang ............................. 441/40 |
| 5,167,554 | A | * | 12/1992 | Tager et al. .................... 441/131 |
| 5,174,599 | A | * | 12/1992 | Hull et al. .................... 280/731 |
| 5,201,543 | A | * | 4/1993  | Hull et al. .................... 280/750 |

(Continued)

FOREIGN PATENT DOCUMENTS

| DE | 9115585.1    | 12/1991 |
| DE | 93 17 875 U1 | 11/1993 |

(Continued)

OTHER PUBLICATIONS

Merriam-Webster's Collegiate Dictionary, Tenth Edition, 1999, p. 998.*

(Continued)

*Primary Examiner* — Vinh Luong
(74) *Attorney, Agent, or Firm* — Wilmer, Cutler Pickering Hale & Dorr LLP.

(57) ABSTRACT

A system and method for relieving and preventing fatigue caused by extended gripping of a vehicle/vessel steering wheel. The system includes a first section that attaches to the rim of the steering wheel at a predetermined location and a rigid, semi-rigid, or flexible second section that connects to, and extends outwardly from, the first section. The second section supports a portion of the body such as wrists, hands, and forearms.

9 Claims, 6 Drawing Sheets

U.S. PATENT DOCUMENTS

| | | | |
|---|---|---|---|
| 5,207,713 A * | 5/1993 | Park | 74/558 |
| 5,507,205 A * | 4/1996 | Ruimi | 74/558 |
| 6,658,965 B2 * | 12/2003 | Allen | 74/526 |
| 7,895,918 B2 * | 3/2011 | Belsole | 74/552 |
| 2002/0162416 A1 | 11/2002 | Gemma | |
| 2004/0129108 A1 | 7/2004 | Wilson | |

FOREIGN PATENT DOCUMENTS

| | | | |
|---|---|---|---|
| GB | 13892 | 3/1916 | |
| GB | 689 548 A | 3/1951 | |
| JP | H04-002569 | 1/1992 | |
| JP | 4-78769 | * 3/1992 | |
| JP | H06-63472 | 9/1994 | |
| JP | 2001-286348 | * 10/2001 | 74/552 X |
| JP | 2002103451 A | 9/2002 | |
| WO | WO 2004/048152 | 6/2004 | |
| WO | WO-2004048152 A2 | 6/2004 | |

OTHER PUBLICATIONS

PTO Oct. 3328, Translation of JP 4-78769, Shigeru, Mar. 12, 1992.*
English abstract of JP 4-78769, Shigeru, Mar. 12, 1992.*
Japanese Office Action issued for Appl. No. 2006-541393, dated Jun. 13, 2011 (7 pages).
European Patent Office, Supplementary Search Report issued for corresponding European Patent Application No. 03783757.2 mailed Nov. 3, 2006 (3 pages).
European Office Action issued for European Application No. 04811494.6, issued on Sep. 9, 2009.

* cited by examiner

FATIGUE RELIEVING SUPPORT FOR STEERING WHEELS AND THE LIKE

RELATED APPLICATIONS

This application claims the benefit of priority under 35 U.S.C. §119(e) from U.S. Provisional Application Ser. No. 60/429,130 filed Nov. 26, 2002, entitled "Fatigue Relieving Support for Steering Wheels and the Like", and this application claims the benefit of priority under 35 U.S.C. §120 from United States Patent Application Serial Number, filed Nov. 24, 2003, entitled "Fatigue Relieving Support for Steering Wheels and the Like", which are incorporated herein by reference.

FIELD OF THE INVENTION

The present invention relates to systems and methods that may be used by vehicle and vessel operators to relieve and/or prevent fatigue in the arms and hands when operating directional controls.

BACKGROUND OF THE INVENTION

In learning to drive, a person is taught that the preferable placement of the hands with respect to a steering wheel is at the ten and two o'clock (i.e., 10:00 and 2:00) positions. These hand locations are said to give the driver the best control of the operation of the vehicle, which includes automobiles, trucks, tractors, or other types of vehicles with steering wheels, as well as nautical vessels and aircraft.

If the arms and hands are held on the steering wheel at these locations for extended periods of time, they become fatigued. To relieve this fatigue, often they are removed from the steering wheel and rotated, shaken, or exercised in some way to reenergize them.

In the fatigued state, the arms and hands feel very stiff and less mobile. Further, in the fatigued condition, the ability of the arms and hands to rapidly react to emergency situations and properly control the vehicle is greatly reduced and accidents are more likely to occur. This problem arises in any vehicle or vessel and is not restricted to automobiles nor automobile-type steering controls.

There needs to be a system that will prevent and/or relieve this fatigue, yet not interfere with the operator's ability to control the vehicle or vessel.

SUMMARY OF THE INVENTION

The present invention is a system and method that is associated with a steering wheel or vehicular directional control that relieves or prevents fatigue, for example, when operator drives for extended periods of time. The system of the present invention may be formed integral with, or attached to, the wheel or control. Each embodiment of the system will provide support to at least a portion of the vehicle or vessel operator's body so as to relieve or prevent fatigue.

The system of the present invention will include at least one part that extends outward at an angle from a plane across the face of the steering wheel or vehicular control. This part is at least partially deformable in at least one direction, so that the system will not interfere with the operation of the wheel or control. This deformability, however, will not impede the support function of the system on the invention. Furthermore, the deformable material has memory, so that after a deforming force is removed, it resumes its original predeformation configuration and shape, which is extending outward at an angle from a plane across the face of the steering wheel or vehicular control.

It is an object of the present invention to have a system and method that may be implemented with the steering control of a vehicle or vessel to prevent or lessen the amount of fatigue that occurs in the arms and hands from driving or steering over extended periods of time.

The features and advantages of the present invention will be more readily apparent and understood from the following detailed description of the invention, which should be understood in conjunction with the accompanying drawings and claims that are appended to the end of the detailed description.

DETAILED DESCRIPTION

Figure 1:
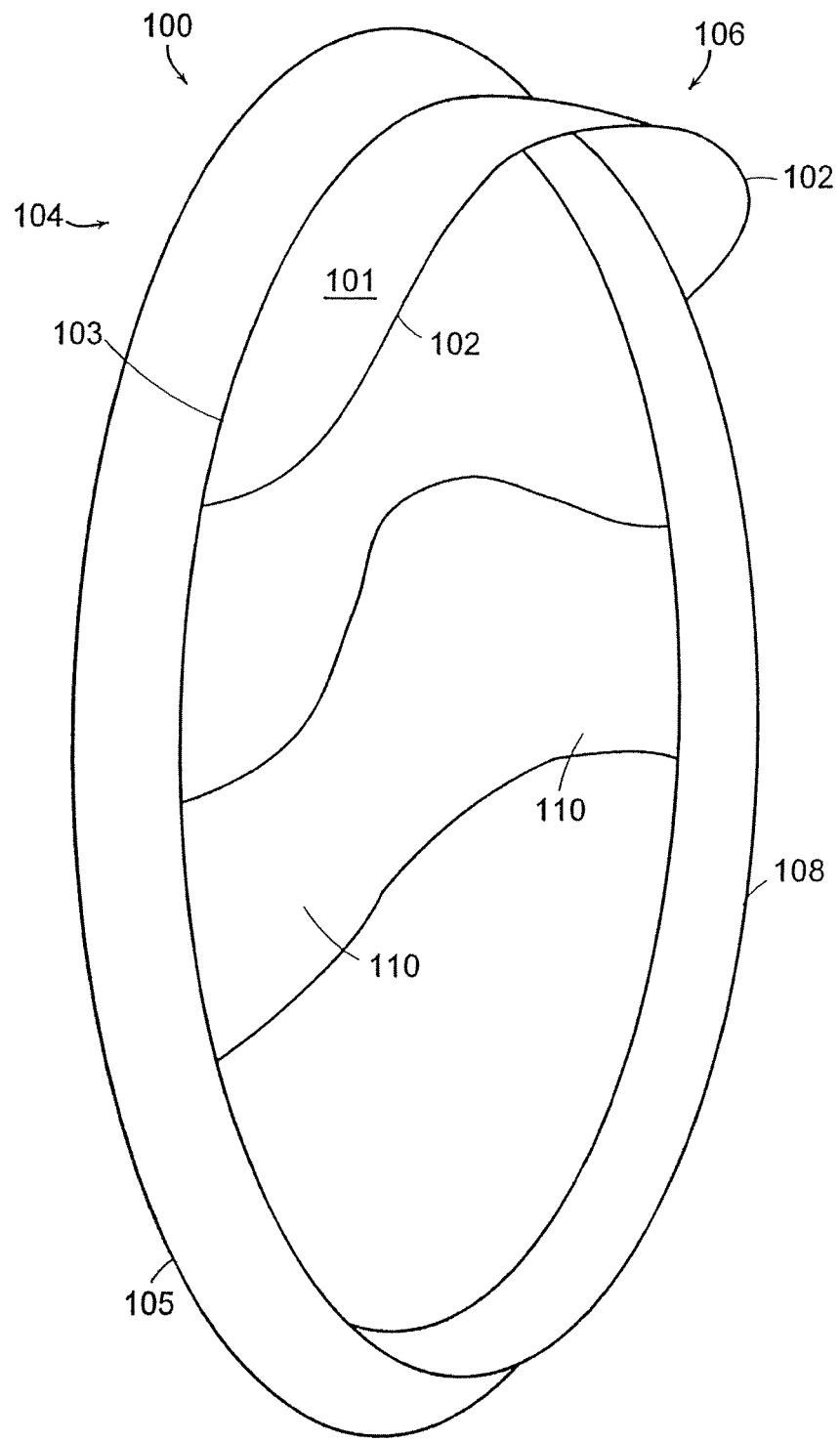
FIG. 1 is a perspective view of a steering wheel with an embodiment of the system of the present invention associated with it.

For purposes of illustration only, and not to limit the scope of the present invention, the invention will be explained with reference to the specific steering wheel examples indicated in the drawings. One skilled in the art would understand that the present invention is not limited to the specific examples disclosed and can be more generally applied to other transport means having different steering controls than those disclosed.

Referring to FIG. 1, generally at 100, an embodiment of system 101 of the present invention is shown attached to steering control 105. System 101 includes first section 103 that connects to steering control 105 and deformable second section 102. First section 103 may be formed from a rigid, semi-rigid, or deformable material. If it is deformable, it may have memory. Second section 102 that connects to first section 103 may be formed from a deformable material that has memory. However, the second section may be rigid, semi-rigid or flexible, or deformable and still be within the scope of the present invention.

Deformable material 102 extends outward from the steering control 105 over a predetermined section of the steering control which is shown in FIG. 1 to be an arc. Deformable second section 102 may extend outwardly from the steering control at or below the inside circumference of the control over the predetermined arc. This arc will typically include at least the ten 104 and two 106 o'clock positions, or may include the entire circumference. As shown in FIG. 1, the arc that covers the ten 104 and two 106 o'clock positions is disposed on the upper one-half (½) of steering control 105.

If the first section is deformable, the second section also may extend outwardly from steering control 105 over a predetermined section of the steering control that is shown in FIG. 1 to be an arc. The material may extend outwardly from the steering control at or below the inside circumference of the control over the predetermined arc. As before, this area will typically include at least the ten and two o'clock portions, or may include the entire circumference.

Steering control 105 may be a normal steering wheel, with a rim 108 and spokes 110. Alternatively, the steering control 105 may take on other forms as is known to those in the art, i.e., an aircraft yoke.

Figure 2:
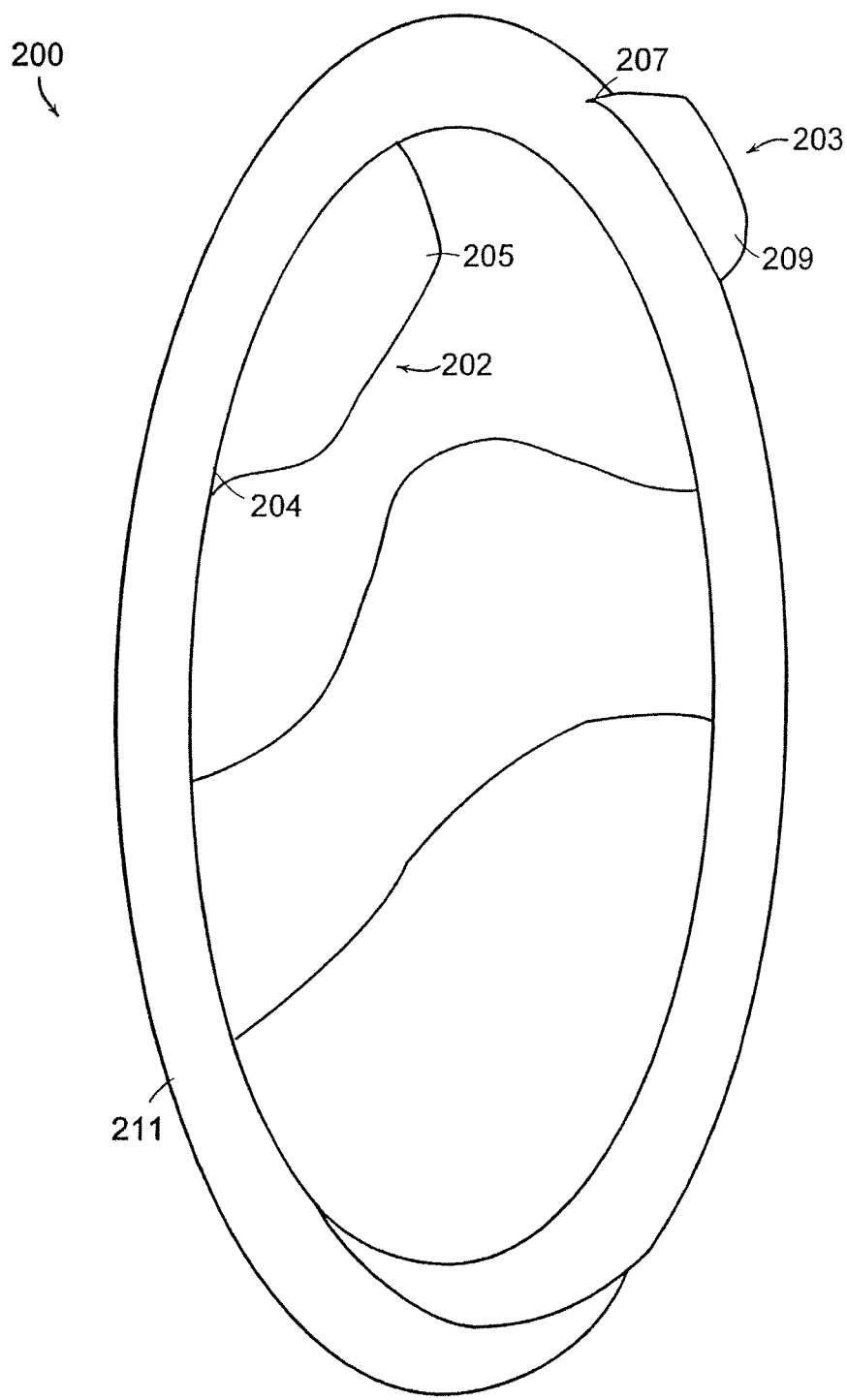
FIG. 2 is a perspective view of a steering wheel with multiple systems of an embodiment of the present invention associated with the steering wheel.

In FIG. 2, generally at 200, steering control 211 has two systems of the present invention associated with it. The first is shown at 202 and the second at 203. The first and second systems in FIG. 2, extend over a smaller arc of the steering control compared to the single system shown in FIG. 1.

The first system of the present invention at 202 includes first section 204 that connects to steering control 211 and second section 205 that extends outward from first section 204. Further, a second section such as 205 extends outward at an angle from a plane across the face of a steering control such as 211 (see FIG. 3). First section 204 may be rigid, semi-rigid, or deformable, while second section 205 is deformable. If the first section is deformable, it may have memory.

Similarly, the second system of the present invention at 203 includes first section 207 that connects to steering control 211 and second section 209 that extends outward from first section 207. First section 207 may be rigid, semi-rigid, or deformable, while second section 209 is deformable. Again, if the first section is deformable, it may have memory. Further, second sections 205 and 209 may be rigid, semi-rigid or flexible, or deformable and still be within the scope of the present invention.

In FIG. 2, system 202 is at or near the ten o'clock position and system 203 is shown at or near the two o'clock position. As shown in FIG. 2, system 202 that is at or near the ten o'clock position and system 203 that is at or near the two o'clock position are disposed on the upper one-half (½) of steering control 211. Although, the two systems have been described as being positioned at the ten and two o'clock locations, it is understood that they may be placed at other locations around the rim and there may be more than two systems and still be within the scope of the present invention.

If the first sections are deformable, then each second section may extend outwardly from the steering control over a predetermined arc. These second sections may also extend at or below the inside circumference of the control over the predetermined arc.

Referring to FIGS. 1 and 2, first section 103 in FIG. 1, and first sections 204 and 207 in FIG. 2, may be formed integral with steering control 105 and 211, respectively. Given that the system is disposed at or below the inside circumference of the steering wheel, in this configuration, the operator can securely grip the steering wheel over the system when the wrists or portions of the hands are resting on the deformable second section. Further, the first section may be constituted as an interface to which the second section attaches.

Figure 3:
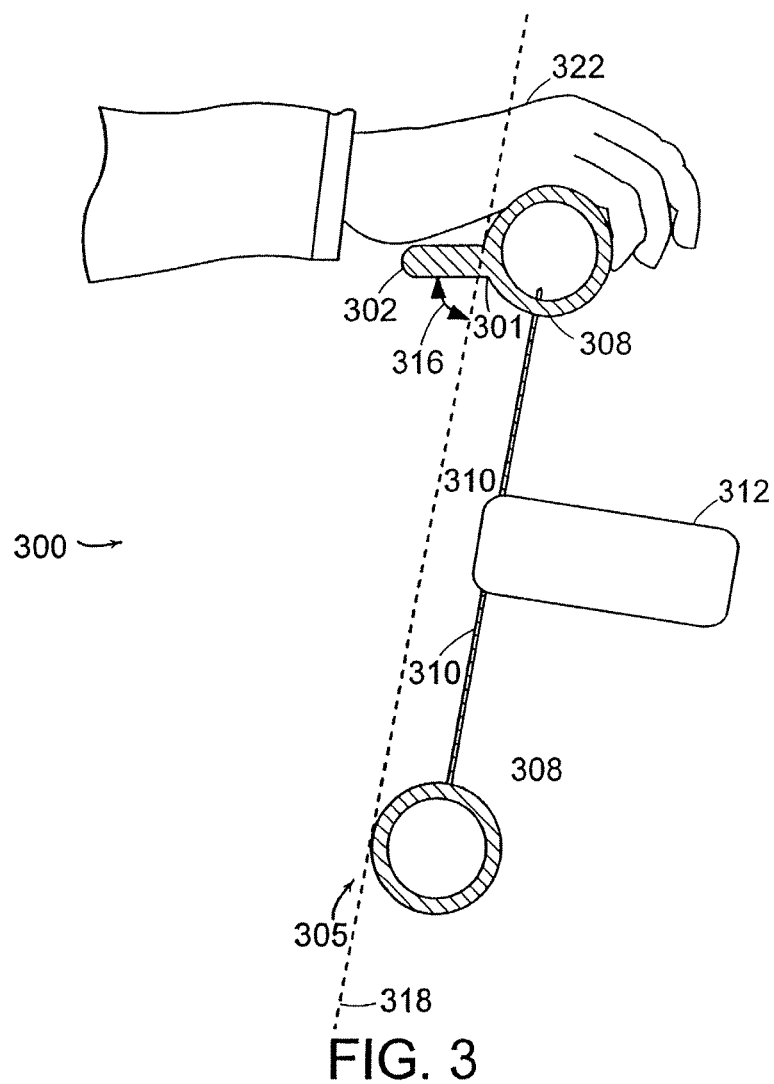
FIG. 3 is a cross-section of the steering wheel shown on FIG. 1, with an operator's hand resting on an embodiment of the system of the present invention.

Referring to FIG. 3, generally at 300, steering control 305 is shown that includes rim 308, spokes 310, and steering column 312. First section 301 is formed integral with rim 308 and deformable second section 302 extends outward from the first section. As is shown, second section 302 extends outward at angle 316 from plane 318 across the face of steering control 305. The material of second section 302 has sufficient strength that when driving, the driver may rest his/her wrists or portions of the hands 322 on the material and they will be supported. The structure is such that the weight of the arms and hands through the wrists or portions of the hands are supported without the material deforming.

Figure 4:
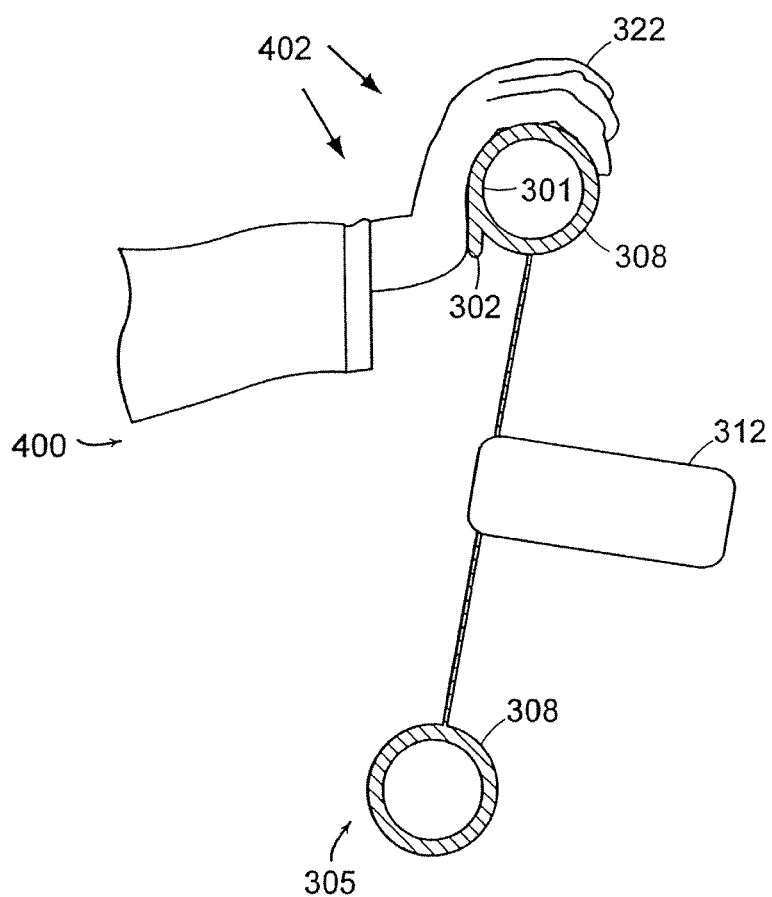
FIG. 4 is a cross-section of the steering wheel of FIG. 1, with an operator's hand firmly grasping the steering wheel as in an emergency situation that deforms the system of the present invention.

When the wrists or portions of the hands are supported, as shown in FIG. 3, the driver can firmly grip the steering control rim 308 over first section 301 in a manner that he or she has full control of the vehicle. Deformable second section 302 is easily deformable in a direction opposite to which it provides support or any other direction if a sufficient deforming force is applied to second section 302. Therefore, if the driver should grip the steering control by pushing the material upwardly, it will readily deform to permit such a grip. Also, as shown in FIG. 4, generally at 400, if the driver should grip the steering wheel control rim 308 by grasping it such that deformable second section 302 is compressed toward, or below the interior circumference of, the steering control, it will readily compress and be deformed in such a manner that the driver can grip the steering wheel. Arrows 402 represent the force applied by the driver to the steering wheel control rim 308, resulting in the deformation of second section 302. Second section 302 is deformed in this manner so that it will not affect the driver's ability to grasp the steering control in any emergency situation.

Deformable section 302 has memory such that after deforming pressure is removed, it will return to its original position. When this is done, the system of the present invention will appear as shown in FIG. 1, 2, or 3. Once the deformable second section has returned to its original position, it will again be in condition to support the arms and hands through the wrists or portions of the hands resting on the deformable second section.

If the second section shown in FIG. 3 is non-deformable, it will still support the wrists and portions of the hands/arms resting on them.

Figure 5:
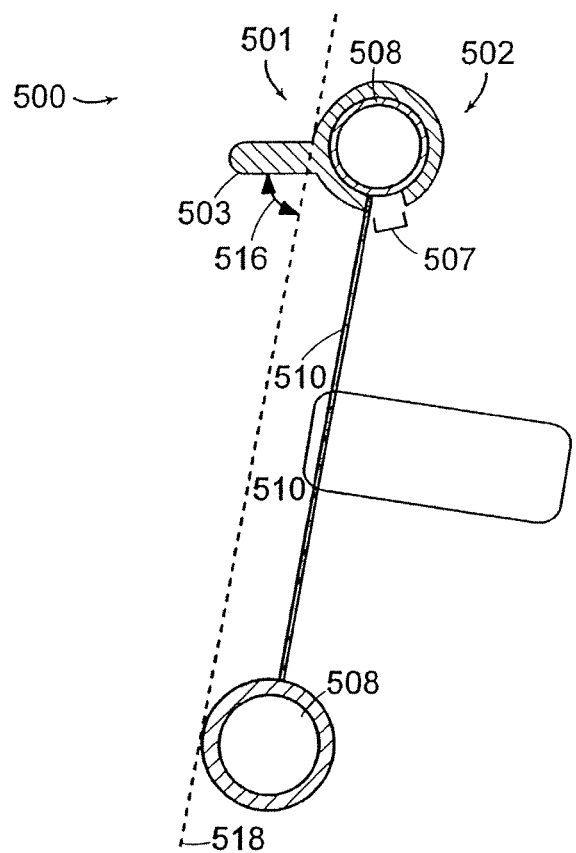
FIG. 5 is a cross-section of another embodiment of the system of the present invention, in which the system snaps or clips onto the steering wheel.

Referring to FIG. 5, generally at 500, a second embodiment of the present invention is shown. System 501 of the present invention shown in FIG. 5 includes a first section 502 that detachably connects to steering control rim. Deformable second section 503 connects to, and extends outwardly from, first section 502. As is shown, deformable second section 503 extends outward at angle 516 from plane 518 across the face of steering control rim 508. First section 502 may snap-on or otherwise attach to the steering control such that it may appear integral with the steering control. One of many possible known means for accomplishing this is by first section 502 being mostly rigid, and leaving a space 507 so the attachment can be forced over rim 508 and leave room for the steering control spokes 510. Regardless of the means for attachment, once first section 502 is attached to the steering control, it will provide all of the benefits that have been described for the first section being integrally formed with the rim. Additionally, the second embodiment, may be a single structure with a single resting material support, a single structure with multiple resting supports, or multiple structures each with its own resting support. As in the other embodiments, the second section may be rigid, semi-rigid or flexible, or non-deformable and still be within the scope of the present invention.

Figure 6:
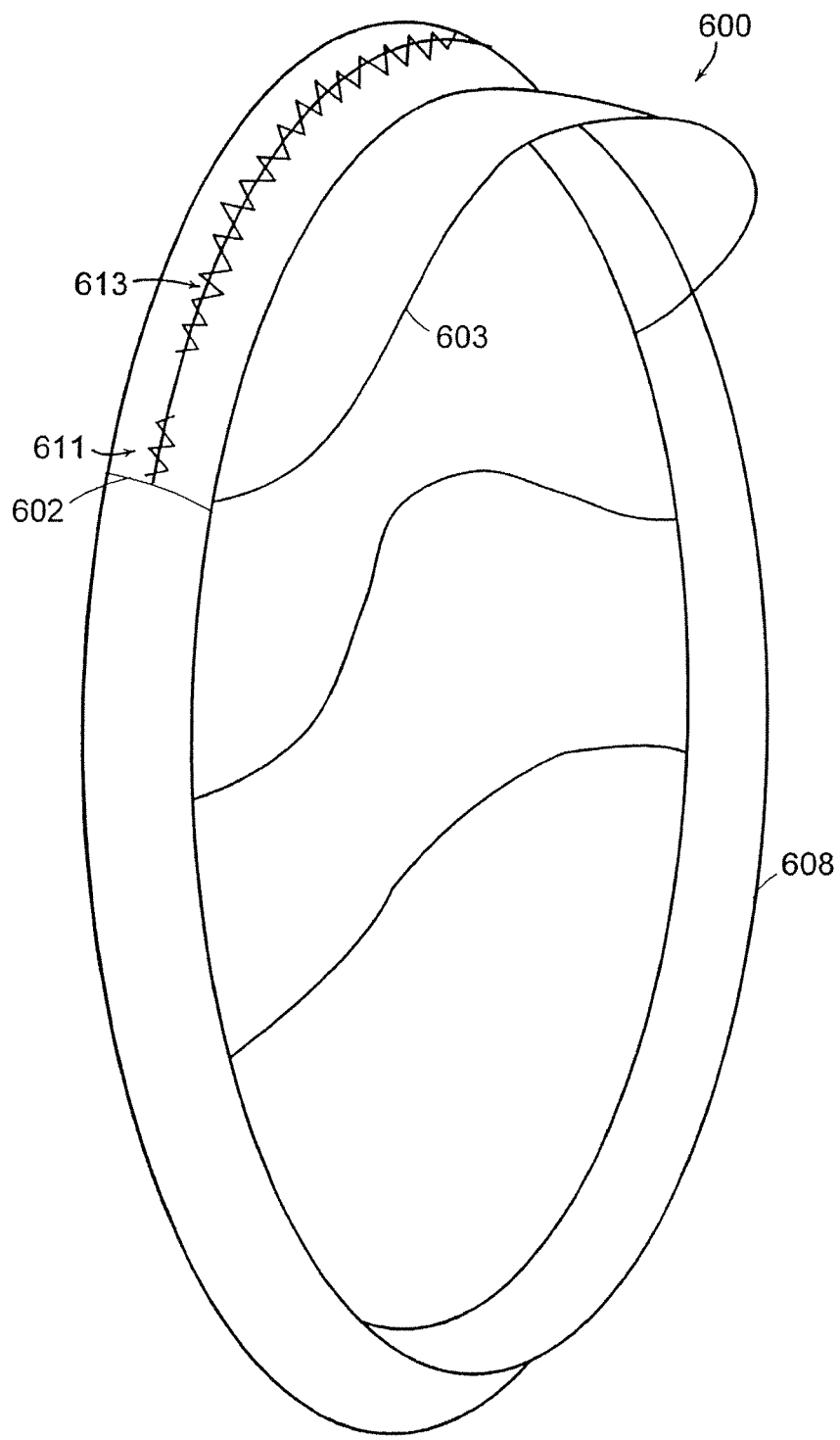
FIG. 6 is a perspective view of another embodiment of the system of the present invention, in which the system envelops the steering wheel rim and is fastened in place.

By way of example, FIG. 6, generally at 600, shows another alternate method to attach the system of the present invention to steering control rim 608. The system in this figure has first section 602 that will envelop rim 608. First section 602 may be made from a flexible material. First section 602 may have a slit 611 which after this section envelops the rim may be stitched shut by stitches 613. As in the other embodiments of the present invention, deformable second section 603 connects to, and extends outwardly from, first section 602. Again, the second section may be rigid, semi-rigid or flexible, or deformable and still be within the scope of the present invention.

It is understood by those skilled in the arts that the system can be adjusted in terms of size and orientation to adapt to different operator sizes and preferences.

Having described the embodiments of the invention, it should be apparent that various combinations of the embodiments may be made or modifications added thereto as is known to those skilled in the art without departing from the spirit and scope of the invention, which is defined in the claims below.

What is claimed is:

1. A fatigue relieving/preventing apparatus associated with a steering wheel for controlling a vehicle, comprising:
    a first section that connects to a peripheral portion of the steering wheel; and
    a rigid, semi-rigid or flexible, or non-deformable second section that connects to, and extends from the first section at the peripheral portion of the steering wheel, the second section extends from the first section outward at an angle to a plane across a front face of the steering wheel, the second section for providing resting support for at least a portion of a vehicular operator's body when pressure from the portion of the vehicular operator's body on the second section is less than the pressure for deforming the second section out of interference with the vehicular operator's ability to operate the steering wheel, and deforming out of interference with the vehicular operator's ability to operate the steering wheel when pressure from the portion of the vehicular operator's body on the second section is equal to or greater than the pressure for deforming the second section out of interference with the vehicular operator's ability to operate the steering wheel.

2. The apparatus as recited in claim 1, wherein the steering wheel includes the steering wheel for controlling at least a nautical vessel, aircraft, or ground transportation vehicle.

3. The apparatus as recited in claim 1, wherein the portion of the body supported by the second section includes at least a forearm, wrist, or hand.

4. The apparatus as recited in claim 1, wherein the first section extends a predetermined length of the peripheral portion of the steering wheel.

5. The apparatus as recited in claim 1, wherein the second section includes at least two second sections that each connect to the first section at separate locations.

6. The apparatus as recited in claim 4 or 5, wherein the first section is deformable.

7. The apparatus as recited in claim 1, wherein each first section is formed integral with the steering wheel.

8. The apparatus as recited in claim 1, wherein each first section is detachable from the steering wheel.

9. The apparatus as recited in claim 1, wherein the first section is flexible, rigid, or semi-rigid, or non-deformable.

* * * * *